United States Patent
Hong et al.

(10) Patent No.: US 10,324,243 B2
(45) Date of Patent: Jun. 18, 2019

(54) HIGH BRIGHTNESS POLARIZING PLATE AND LIQUID CRYSTAL DISPLAY DEVICE INCLUDING THE SAME

(71) Applicant: LG CHEM, LTD., Seoul (KR)

(72) Inventors: Kyung-Ki Hong, Daejeon (KR); Jae-Ho Jung, Daejeon (KR); Jun-Wuk Park, Daejeon (KR); Byung-Min Lee, Daejeon (KR); Jae-Hoon Shim, Daejeon (KR); Je-Hyuk Yoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/389,681

(22) PCT Filed: Jul. 24, 2014

(86) PCT No.: PCT/KR2014/006752
§ 371 (c)(1),
(2) Date: Sep. 30, 2014

(87) PCT Pub. No.: WO2015/012617
PCT Pub. Date: Jan. 29, 2015

(65) Prior Publication Data
US 2016/0266293 A1    Sep. 15, 2016

(30) Foreign Application Priority Data

Jul. 26, 2013 (KR) .................. 10-2013-0088863
Jul. 23, 2014 (KR) .................. 10-2014-0093138

(51) Int. Cl.
*C08K 3/36* (2006.01)
*G02B 5/30* (2006.01)
(Continued)

(52) U.S. Cl.
CPC ............. *G02B 5/3025* (2013.01); *G02B 1/14* (2015.01); *G02F 1/133528* (2013.01)

(58) Field of Classification Search
CPC .......... G02B 5/3025; G02B 1/14; G02B 1/10; G02F 1/133528
See application file for complete search history.

(56) References Cited

U.S. PATENT DOCUMENTS 4,889,775 A * 12/1989 Adaniya .............. C08G 18/643
428/623
2003/0011725 A1   1/2003 Ohkawa et al.
(Continued)

FOREIGN PATENT DOCUMENTS

CN    101082735 A    12/2007
CN    101669050 B    3/2010
(Continued)

*Primary Examiner* — Michael H Caley
*Assistant Examiner* — Jonathan Y Jung
(74) *Attorney, Agent, or Firm* — Dentons US LLP

(57) ABSTRACT

There are provided a high brightness polarizing plate and a liquid crystal display device including the high brightness polarizing plate as a lower polarizing plate. The high brightness polarizing plate includes: a polarizer; and a protective film disposed on a side of the polarizer, wherein the protective film faces a backlight unit, and a primer layer including a low-refractive polymer resin and fine hollow particles is formed on a side of the protective film opposite to a side thereof facing the polarizer.

11 Claims, 1 Drawing Sheet

(51) Int. Cl.
*G02F 1/1335* (2006.01)
*G02B 1/14* (2015.01)

(56) References Cited

U.S. PATENT DOCUMENTS

| | | |
|---|---|---|
| 2003/0194533 A1 | 10/2003 | Amimori et al. |
| 2006/0153979 A1* | 7/2006 | Asakura ............ B32B 27/30 427/164 |
| 2007/0146887 A1* | 6/2007 | Ikeda ............... G02B 1/111 359/586 |
| 2007/0242362 A1 | 10/2007 | Takada et al. |
| 2007/0279551 A1 | 12/2007 | Umebayashi |
| 2009/0027599 A1* | 1/2009 | Ohgaru ............. C08K 5/10 349/96 |
| 2010/0134879 A1 | 6/2010 | Yoshihara et al. |
| 2010/0220264 A1* | 9/2010 | Misono ........... G02B 6/0056 349/65 |
| 2013/0135726 A1 | 5/2013 | Wakizaka et al. |

FOREIGN PATENT DOCUMENTS

| | | | |
|---|---|---|---|
| JP | 2001-33625 A | | 2/2001 |
| JP | 2003-131035 A | | 5/2003 |
| JP | 2005-316101 A | | 11/2005 |
| JP | 2007-163754 A | | 6/2007 |
| JP | 2008-10393 A | | 1/2008 |
| JP | 2008-90263 A | | 4/2008 |
| JP | 2009-276738 A | | 11/2009 |
| JP | 2012-242837 A | | 12/2012 |
| JP | 2013-130865 A | | 7/2013 |
| KR | 20050108239 A | * | 11/2005 |
| KR | 1020050108239 A | | 11/2005 |
| KR | 20080024452 A | * | 3/2008 |
| KR | 20080024452 A | * | 3/2008 |
| KR | 1020120071745 A | | 7/2012 |
| KR | 1020120107256 A | | 10/2012 |
| KR | 101462579 B1 | * | 11/2014 |

* cited by examiner

[Figure 1]
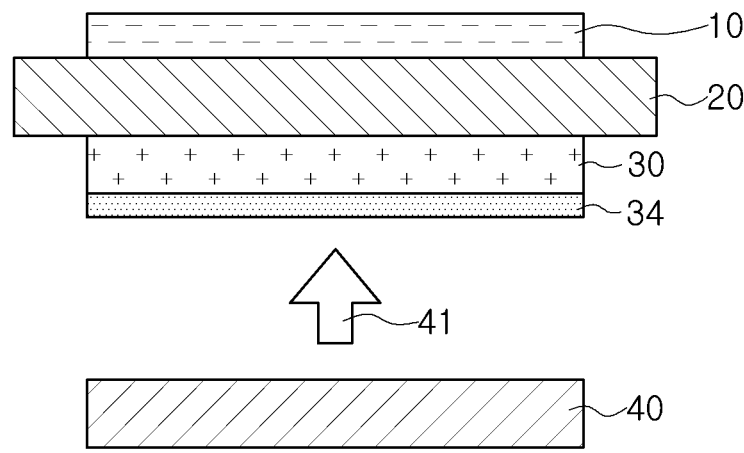
[Figure 2]
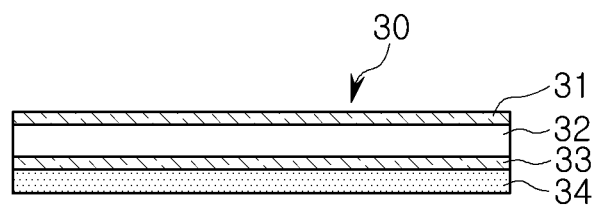
[Figure 3]
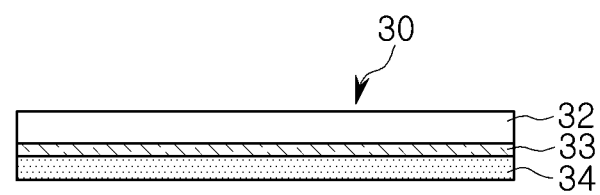

HIGH BRIGHTNESS POLARIZING PLATE AND LIQUID CRYSTAL DISPLAY DEVICE INCLUDING THE SAME

This application is a 35 USC § 371 National Stage entry of International Application No. PCT/KR2014/006752, filed on Jul. 24, 2014, which claims priority from Korean Patent Application Nos. 10-2013-0088863, filed on Jul. 26, 2013 and 10-2014-0093138, filed on Jul. 23, 2014, in the Korean Intellectual Property Office, all of which are incorporated herein by reference in their entirety.

TECHNICAL FIELD

The present disclosure relates to a high brightness polarizing plate and a liquid crystal display device including the high brightness polarizing plate, and more particularly, to a high brightness polarizing plate having superior anti-blocking characteristics while allowing for increases in the brightness of a liquid crystal display device, and a liquid crystal display device including the high brightness polarizing plate.

BACKGROUND ART

Liquid crystal display devices have recently been used in a wide range of devices including small electronic devices such as cellular phones as well as in large electronic devices, such as personal computers and televisions, and the application range thereof has been gradually widened. Since such Liquid crystal display devices are not self-luminous, generally, a light source such as a backlight unit is disposed at one side of a lower polarizing plate located below a liquid crystal cell, and light emitted from the light source is directed to pass through the liquid crystal cell to display images.

Liquid crystal display devices having high levels of brightness can display brighter images. In addition, Liquid crystal display devices having high levels of white brightness can have high contrast ratios, and thus, can display clear images. Therefore, a large amount of research has been actively conducted into improving the brightness of Liquid crystal display devices.

In the related art, a method of decreasing the content of iodine in a polarizer has been proposed as a method of improving the brightness of Liquid crystal display devices. However, the proposed method may result in a decrease in the degree of polarization. Furthermore, in other techniques proposed for improving light use efficiency, a reflective polarizing plate is disposed around a lower polarizing plate, and light emitted from a backlight unit but having a polarization state unnecessary for the lower polarizing plate is selectively reflected by the reflective polarizing plate toward a reflective plate of the backlight unit so that the light can be re-reflected. However, these techniques require additional processes and relatively expensive materials.

In general, an air gap exists between a lower polarizing plate and a backlight unit of a Liquid crystal display device and, due to a difference in refractive indices between the air gap and the lower polarizing plate, light may be reflected. Due to such a reflection of light, the amount of light emitted from the backlight unit and incident on the lower polarizing plate is reduced to result in a decrease in brightness. Although the existing brightness improving methods described above can be used to increase light use efficiency, the existing brightness improving methods can not be used to prevent a decrease in brightness such as that caused by an air gap.

Therefore, a new technique is needed for improving the brightness of a Liquid crystal display device by preventing a decrease in brightness caused by an air gap between a lower polarizing plate and a backlight unit.

DISCLOSURE

Technical Problem

Aspects of the present disclosure may provide a high brightness polarizing plate having superior anti-blocking characteristics and brightness by preventing a brightness decrease caused by an air gap between a lower polarizing plate and a backlight unit, and a liquid crystal display device including the high brightness polarizing plate.

The present disclosure is not limited to the above-mentioned aspects. The above-mentioned aspects and other aspects of the present disclosure will be clearly understood by those skilled in the art through the following description.

Technical Solution

According to an aspect of the present disclosure, a high brightness polarizing plate may include: a polarizer; and a protective film disposed on a side of the polarizer, wherein the protective film may face a backlight unit, and a primer layer including a low-refractive polymer resin and fine hollow particles may be formed on a side of the protective film opposite to a side thereof facing the polarizer.

The high brightness polarizing plate may be a lower polarizing plate of a liquid crystal display device.

The primer layer may have a refractive index of 1.48 or lower.

The primer layer may have a static friction coefficient of 0.8 or lower.

The primer layer may have a dynamic friction coefficient of 0.8 or lower.

The fine hollow particles may be hollow silica particles.

The fine hollow particles have a refractive index of 1.40 or lower.

The fine hollow particles may have an average particle size of 10 nm to 200 nm.

The fine hollow particles may be included in an amount of 10 parts by weight to 300 parts by weight based on 100 parts by weight of the low-refractive polymer resin.

The low-refractive polymer resin may include a polyurethane-based resin, an acrylic resin, a polyester-based resin, or a combination thereof.

The low-refractive polymer resin may have a refractive index of 1.55 or lower.

The primer layer may have a thickness of 10 nm to 500 nm.

The protective film may have a reflectivity of 3.5% or lower.

The protective film may have a transmittance of 93% or higher.

According to another aspect of the present disclosure, a liquid crystal display device may include: a liquid crystal cell; an upper polarizing plate disposed above the liquid crystal cell; a lower polarizing plate disposed below the liquid crystal cell; and a backlight unit disposed below the lower polarizing plate, wherein the lower polarizing plate may be the high brightness polarizing plate.

The above-described aspects of the present disclosure do not include all aspects or features of the present disclosure. Other aspects or features, advantages, and effects of the present disclosure will be clearly understood from the following descriptions of embodiments.

Advantageous Effects

In the present disclosure, the high brightness polarizing plate includes a primer layer formed on a side adjacent to a backlight unit by using a low-refractive polymer resin and fine hollow particles, and since the primer layer has superior anti-blocking characteristics, an additional functional coating layer may not be used to prevent rolling of a film during a manufacturing process.

In addition, since the primer layer prevents the scattering of light in an air gap between the high brightness polarizing plate and a backlight unit, the amount of light incident on a liquid crystal cell may be increased. Therefore, a liquid crystal display device including the polarizing plate may have improved brightness.

Furthermore, the primer layer of the high brightness polarizing plate may be formed using a simple method with low costs, and thus the high brightness polarizing plate may have good price competitiveness.

DESCRIPTION OF DRAWINGS

FIG. 1 is a cross-sectional view illustrating a liquid crystal display device according to an embodiment of the present disclosure.

FIGS. 2 and 3 are cross-sectional views illustrating a high brightness polarizing plate according to embodiments of the present disclosure.

BEST MODE

Embodiments of the present disclosure will now be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Furthermore, in the accompanying drawings, the size of each constituent element may be enlarged or reduced, or some constituent elements may be omitted, so as to provide a clear understanding of the embodiments of the present disclosure.

The inventors have repeatedly conducted research and found that if a primer layer including a low-refractive polymer resin and fine hollow particles is formed on a protective film which is included in a lower polarizing plate disposed below a liquid crystal cell and is adjacent to a backlight unit, superior anti-blocking characteristics can be obtained, and brightness can be improved by simply reducing the reflection of light coming from the backlight unit without having to performing additional processes. Based on this knowledge, the inventors have invented the present invention.

FIG. 1 illustrates a liquid crystal display device according to an embodiment of the present disclosure.

The liquid crystal display device illustrated in FIG. 1 includes: a liquid crystal cell 20; an upper polarizing plate 10 disposed above the liquid crystal cell 20; a high brightness polarizing plate 30 disposed below the liquid crystal cell 20; and a backlight unit 40 disposed below the high brightness polarizing plate 30, wherein a primer layer 34 is disposed on a side of the high brightness polarizing plate 30 adjacent to the backlight unit 40.

Hereinafter, the constituent elements of the liquid crystal display device of the embodiment of the present disclosure will be described in more detail.

1. High Brightness Polarizing Plate

First, the high brightness polarizing plate 30 of the liquid crystal display device of the present disclosure will be described.

The high brightness polarizing plate 30 of the present disclosure includes polarizer 32 and protective films 31 and 33 on at least one side of the polarizer 32. The protective films 31 and 33 may be disposed on both sides of the polarizer 32, that is, upper and lower sides of the polarizer 32. Alternatively, a protective film may be disposed only below the polarizer 32.

In the high brightness polarizing plate 30 of the present disclosure, the protective film 33 disposed below the polarizer 32 to face the backlight unit 40 includes the primer layer 34 formed on a side thereof opposite to a side thereof facing the polarizer 32.

FIGS. 2 and 3 illustrate implementation examples of the high brightness polarizing plate 30 according to embodiments of the present disclosure.

Referring to FIG. 2, the high brightness polarizing plate 30 of the present disclosure may include a polarizer 32; a liquid crystal cell side protective film 31 disposed above the polarizer 32; a backlight unit side protective film 33 disposed below the polarizer 32; and a primer layer 34 provided on a side of the backlight unit side protective film 33 adjacent to the backlight unit 40.

Alternatively, as shown in FIG. 3, the exemplary high brightness polarizing plate 30 of the present disclosure may include a polarizer 32; a backlight unit side protective film 33 disposed below the polarizer 32; and a primer layer 34 provided on a side of the backlight unit side protective film 33 adjacent to the backlight unit 40.

Although not shown in FIGS. 2 and 3, the exemplary high brightness polarizing plate 30 of the present disclosure may include a retardation film so as to compensate for an optical phase difference generated in the liquid crystal cell 20. In the case, the retardation film may be provided on the liquid crystal cell side protective film 31 if the liquid crystal cell side protective film 31 is formed, or may be provided on the polarizer 32 if only the backlight unit side protective film 33 is formed. In the present disclosure, the retardation film is not limited to a particular type thereof. For example, any type of retardation film generally used in the related art may be used according to various liquid crystal modes of the liquid crystal display device.

The constituent elements of the high brightness polarizing plate 30 will now be described in more detail.

A. Polarizer

In the present disclosure, any polarizer known in the related art may be used as the polarizer 32 without limitations. For example, a film formed of polyvinyl alcohol (PVA) containing iodine or a dichroic dye may be used as the polarizer 32. The polarizer 32 may be formed by dyeing a PVA film with iodine or a dichroic dye. However, the polarizer 32 is not limited thereto.

In the present disclosure, the term "polarizer" refers to a polarizer not including a protective film, and the term "polarizing plate" refers to a polarizing plate including a polarizer and a protective film.

B. Protective Films

The protective films 31 and 33 protect the polarizer 32. In the present disclosure, the protective films 31 and 33 may be formed of a polymer having features such as low birefringence, high transparency, high mechanical strength, high thermal stability, and high moisture barrier property. For example, films such as acrylic films, polyethylene terephthalate (PET) films, triacetyl cellulose (TAC) films, polynorbornene (PNB) films, cycloollefin polymer (COP) films, or polycarbonate (PC) films may be used as the protective films 31 and 33.

In an embodiment of the present disclosure, the liquid crystal cell side protective film 31 and the backlight unit side protective film 33 may be acrylic films, polyethylene terephthalate (PET) films, or triacetyl cellulose (TAC) films. However, the embodiments of the present disclosure are not limited thereto. Particularly, acrylic films may be used as the protective films 31 and 33 in terms of optical characteristics, durability, and economic factors.

In the present disclosure, the acrylic films may be formed through an extrusion process by using a material including a (meth)acrylate-based resin as a main component. The term "(meth)acrylate-based resin" refers to a material in which a resin having (meth)acrylate-based units is included as a main component. For example, the term "(meth)acrylate-based resin" includes: a homopolymer resin including (meth)acrylate-based units; a copolymer resin in which (meth)acrylate-based units and other monomer units are copolymerized; and a blended resin formed by blending a (meth)acrylate-based resin with another resin.

For example, the (meth)acrylate-based units may be alkyl (meth)acrylate-based units. Herein, the term "alkyl(meth) acrylate unit" is a term including an alkylacrylate-based unit and an alkyl(meth)acrylate-based unit. The alkyl(meth)acrylate-based unit may have an alkyl group having a carbon number of 1 to 10, preferably, 1 to 4.

Monomer units such as styrene-based units, maleic anhydride-based units, or maleimide-based units may be copolymerized with the (meth)acrylate-based units.

In an non-limiting example, the styrene-based units may include styrene, α-methyl styrene, 3-methyl styrene, 4-methyl styrene, 2,4-dimethyl styrene, 2,5-dimethyl styrene, 2-methyl-4-chloro-styrene, 2,4,6-trimethyl styrene, cis-β-methyl styrene, trans-β-methyl styrene, 4-methyl-α-methyl styrene, 4-fluoro-α-methyl styrene, 4-chloro-α-methyl styrene, 4-bromo-α-methyl styrene, 4-t-butyl styrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, 2-hydroxystyrene, and 4-hydroxystyrene. Particularly, the styrene-based units may include styrene or α-methyl styrene. The listed materials may be used individually or in combination.

In a non-limiting example, the maleic anhydride-based units (monomers) may include maleic anhydride, methyl maleic anhydride, ethyl maleic anhydride, propyl maleic anhydride, isopropyl maleic anhydride, cyclohexyl maleic anhydride, and phenyl maleic anhydride. The listed materials may be used individually or in combination.

In a non-limiting example, the maleimide-based units (monomers) may include maleimide, N-methyl maleimide, N-ethyl maleimide, N-propyl maleimide, N-isopropyl maleimide, N-cyclohexyl maleimide, and N-phenyl maleimide. The listed materials may be used individually or in combination.

The acrylic films may be formed by any method. For example, materials such as a (meth)acrylate-based resin, a polymer, and an additive may be fully mixed by an appropriate method to form a thermoplastic resin composition, and films may be formed of the thermoplastic resin composition. In another example, solutions such as a (meth)acrylate-based resin solution, a polymer solution, and an additive solution may be individually prepared and mixed with each other to obtain a uniform solution mixture, and films may be formed using the uniform solution mixture. In the above, an appropriate film forming method such as a solution casting method, a melting extrusion method, a calendaring method, or a compressing method may be used.

The acrylic films may be non-stretched films or stretched films. In the latter case, the acrylic films may be uniaxially stretched films or biaxially stretched films. If the acrylic films are biaxially stretched films, the acrylic films may be simultaneously biaxially stretched films or sequentially biaxially stretched films. Particularly, if the acrylic films are biaxially stretched films, the quality of the acrylic films may be improved owing to improved mechanical strength. The acrylic films may be stretched by a method well known in the related art.

In general, a functional coating layer having superior anti-blocking characteristics (or slippage characteristics) is formed on a side of an acrylic film for imparting characteristics such as an anti-blocking ability to the acrylic film. In the present disclosure, however, the backlight unit side protective film 33 of the high brightness polarizing plate 30 includes the primer layer 34 formed on a side thereof, and the primer layer 34 has superior anti-blocking characteristics (or slippage characteristics). Therefore, the backlight unit side protective film 33 may have superior anti-blocking characteristics (or slippage characteristics) even in the case that the backlight unit side protective film 33 does not include such an additional functional coating layer.

In the high brightness polarizing plate 30 of the present disclosure, the polarizer 32 and the protective films 31 and 33 may be attached to one another as follows: after applying an adhesive to the polarizer 32 or the protective films 31 and 33 using a roll coater, a gravure coater, a bar coater, a knife coater, or a capillary coater, the polarizer 32 and the protective films 31 and 33 are attached to one another by a heating method using attachment rolls, a room-temperature pressing method using attachment rolls, or an UV irradiating method in which UV rays are radiated after attachment. The adhesive may be any adhesive used in the related art such as a polyvinyl alcohol-based adhesive, a polyurethane-based adhesive, an acrylic adhesive, a cation-based adhesive, or a radical-based UV adhesive.

C. Primer Layer

The primer layer 34 provides superior anti-blocking characteristics and increases the amount of light incident on the liquid crystal cell 20 by preventing the reflection of light coming from the backlight unit 40. The primer layer 34 is formed on the side of the backlight unit side protective film 33 opposite to the side facing the polarizer 32 by using a coating composition including a low-refractive polymer resin and fine hollow particles.

In the present disclosure, the brightness of the liquid crystal display device may be improved by a simple method of using the primer layer 34. In more detail, the refractive index of the primer layer 34 is lower than the refractive index of the protective film 33 facing the backlight unit 40 and is not largely different from the refractive index of an air gap, and thus light incident on the high brightness polarizing plate 30 may be less reflected and transmitted through the high brightness polarizing plate 30 with a high degree of transmittance.

The primer layer 34 may be formed on the backlight unit side protective film 33 by applying a coating composition to the backlight unit side protective film (base film) 33 through a coating process well known in the related art such as a bar coating process, a gravure coating process, or a slot die coating process, and drying the coating composition. In this case, the coating composition may be dried in a convection oven. However, the embodiments of the present disclosure are not limited thereto.

Furthermore, if necessary, the protective film 33 may be treated by a surface treatment method such as an alkali treatment method, a corona treatment method, or a plasma treatment method, so as to improve the adhesive strength between the protective film 33 and the primer layer 34.

Preferably, the refractive index of the primer layer 34 may be 1.48 or less, more preferably, 1.30 to 1.48 or 1.35 to 1.47. If the refractive index of the primer layer 34 is higher than the above-mentioned range, the refractive index of the primer layer 34 may be similar to or higher than the refractive index of a triacetyl cellulose film, a cycloolefin polymer film, or an acrylic film used as the protective film 33, and thus the primer layer 34 may have a poor anti-reflection effect and a poor transmittance increasing effect. On the other hand, if the refractive index of the primer layer 34 is lower than the above-mentioned range, it may be difficult to form the primer layer 34.

In addition, the primer layer 34 may preferably have a static friction coefficient of 0.8 or lower, more preferably, 0.6 or lower, or 0.5 or lower. If the static friction coefficient of the primer layer 34 is higher than the above-mentioned range, the primer layer 34 may not have superior anti-blocking characteristics (or slippage characteristics).

In addition, the primer layer 34 may preferably have a dynamic friction coefficient of 0.8 or lower, more preferably, 0.6 or lower, or 0.5 or lower. If the dynamic friction coefficient of the primer layer 34 is higher than the above-mentioned range, the primer layer 34 may not have superior anti-blocking characteristics (or slippage characteristics).

In addition, the primer layer 34 may preferably have a thickness of 10 nm to 500 nm, more preferably, 50 nm to 300 nm. If the thickness of the primer layer 34 is within the above-mentioned range, the anti-reflection ability of the primer layer 34 is high in the visible light region, and thus a high degree of transmittance may be obtained.

The backlight unit side protective film 33 coated with the primer layer 34 may preferably have a reflectivity of 3.5% or lower, more preferably, 3.0% lower. The lower reflectivity the backlight unit side protective film 33 has, the higher transmittance the backlight unit side protective film 33 has.

The backlight unit side protective film 33 coated with the primer layer 34 may preferably have a transmittance of 93% or higher, more preferably, 93.5% or higher. Since the protective film 33 is coated with the primer layer 34, the protective film 33 has an increased degree of transmittance, and thus a higher degree of brightness may be obtained.

Hereinafter, detailed descriptions will be given of the low-refractive polymer resin and the fine hollow particles included in the coating composition for forming the primer layer 34.

The low-refractive polymer resin is included in the coating composition for improving the adhesion of the primer layer 34 to the protective film 33 and the anti-reflection ability of the primer layer 34. In the present disclosure, non-limiting examples of the low-refractive polymer resin may include a polyurethane-based resin, an acrylic resin, a polyester-based resin, and combinations thereof.

The low-refractive polymer resin such as a polyurethane-based resin, an acrylic resin, or a polyester-based resin may be soluble in water, dispersible in water, soluble in an organic solvent, or dispersible in an organic solvent. In this case, the organic solvent is not limited to a particular solvent. That is, any kind of organic solvent may be used as long as the low-refractive polymer resin is soluble or dispersible in the organic solvent and a general coating process may be performed using the organic solvent.

If the low-refractive polymer resin is water-dispersible, a coating process may be easily performed because the low-refractive polymer resin has a relatively low viscosity compared to the case in which the low-refractive polymer resin is water-soluble. Furthermore, although the primer layer 34 is formed by coating a base film such as an acrylic film having low solvent resistance with the water-dispersible low-refractive polymer resin, the water-dispersible low-refractive polymer resin may not result in deteriorations in mechanical properties or surface defects caused by solvent-induced erosion, and thus the base film may be uniformly coated. In addition, the water-dispersible low-refractive polymer resin is ecofriendly and allows for in-line coating during film forming processes because the water-dispersible low-refractive polymer resin does not require equipment for preventing explosions.

The above-mentioned polyurethane-based resin may be obtained by a reaction between a polyol and polyisocyanate. The polyol is not limited to a particular kind of polyol as long as the polyol has two or more hydroxyl groups per molecule. That is, any proper polyol may be used. Examples of the polyol may include a polyester polyol, a polycarbonate diol, and a polyether polyol. At least one or two selected from the group consisting of the listed examples may be used alone or in combination.

In general, the polyester polyol may be obtained by a reaction between a polybasic acid and a polyol. Examples of the polybasic acid may include: aromatic dicarboxylic acids such as ortho-phthalic acid, isophthalic acid, terephthalic acid, 1,4-naphthalenedicarboxylic acid, 2,5-naphthalenedicarboxylic acid, 2,6-naphthalenedicarboxylic acid, biphenyldicarboxylic acid, and tetrahydrophthalic acid; aliphatic decarboxylic acids such as oxalic acid, succinic acid, malonic acid, glutaric acid, adipic acid, pimelic acid, suberic acid, azelaic acid, sebacic acid, linoleic acid, maleic acid, fumaric acid, mesaconic acid, and itaconic acid; alicyclic dicarboxylic acids such as hexahydrophthalic acid, tetrahydrophthalic acid, 1,3-cyclohexanedicarboxylic acid, and 1,4-cyclohexanedicarboxylic acid; and reactive derivatives such as acid anhydrides thereof, alkyl ester, and acid halide. The listed examples of the polybasic acid may be used alone, or at least two of the listed examples may be used in combination. The polyol may be at least one selected from the group consisting of ethyleneglycol, 1,2-propanonediol, 1,3-propanediol, 1,3-butanediol, 1,4-butanediol, neopentylglycol, pentanediol, 1,6-hexanediol, 1,8-octanediol, 1,10-decanediol, 4,4'-dihydroxyphenylpropane, 4,4'-dihydroxylmethylmetane, diethyleneglycol, triethyleneglycol, polyethyleneglycol, dipropyleneglycol, polypropyleneglycol, 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose, sucrose, and sorbitol.

The polycarbonate diol may be aliphatic polycarbonate diol. A polyurethane resin synthesized from aliphatic polycarbonate diol has superior water-resistance, oil-resistance, and weather-resistance properties as well as superior mechanical properties. Particularly, a polyurethane resin synthesized from aliphatic polycarbonate diol is advantageous in terms of anti-reflection because of a relatively low refractive index thereof, as compared to that of an polyurethane resin synthesized from an aromatic substance. Non-limiting examples of the aliphatic polycarbonate diol may include poly(hexamethylene carbonate)glycol and poly(cyclohexane carbonate)glycol. The listed examples may be used alone, or at least two of the listed examples may be used in combination.

In general, the polyether polyol may be obtained by adding an alkyl oxide to a polyhydric alcohol through ring-opening polymerization. Examples of the polyhydric alcohol may include ethyleneglycol, diethyleneglycol, propyleneglycol, dipropyleneglycol, glycerin, and trimethylolpropane. The listed examples may be used alone, or at least two of the listed examples may be used in combination.

The polyisocyanate may be any compound including two or more NCO groups. For example, the polyisocyanate may be one selected from the group consisting of tolylene diisocyanate (TDI), 4,4-diphenylmethane diisocyanate (MDI), 1,5-naphthalene diisocyanate (NDI), tolydine diisocyanate (TODI), hexamethylenediisocyanate (HMDI), isophorone diisocyanate (IPDI), p-phenylene diisocyanate, 1,4-diisocyanate, xylene diisocyanate (XDI), and combinations thereof.

The polyurethane-based resin may be prepared by any proper method known in the art. For example, the polyurethane-based resin may be prepared by a one-shot method in which components react with each other at once or a multistep method in which components react with each other step by step. An appropriate urethane reaction catalyst may be used when the polyurethane-based resin is prepared. If the polyurethane-based resin is dispersible in water, the polyurethane-based resin may be prepared by the multistep method so as to easily introduce hydrophilic groups such as a carboxyl group.

In addition to the above-mentioned components, another polyol and/or another chain extender may be reacted when the polyurethane-based resin is prepared. For example, the other polyol may be a polyol having three hydroxyl groups, such as sorbitol, glycerin, trimethylolethane, trimethylolpropane, and pentaerythritol. Examples of the other chain extender may include: glycols such as ethyleneglycol, diethyleneglycol, triethyleneglycol, 1,3-propanediol, 1,3-butanediol, 1,4-butanediol, neopentylglycol, pentanediol, 1,6-hexanediol, and propyleneglycol; aliphatic diamines such as ethylenediamine, propylenediamine, hexamethylenediamine, 1,4-butanediamine, and aminoethylethanolamine; alicyclic diamines such as isophoronediamine and 4,4'-dicyclohexylmethanediamine; and aromatic diamines such as xylenediamine and tolylenediamine.

In addition, if the polyurethane-based resin is dispersible in water, a neutralizing agent may be used. The neutralizing agent may improve the stability of the polyurethane-based resin in water. Examples of the neutralizing agent may include ammonia, N-methylmorpholine, triethylamine, dimethylethanolamine, methyldiethanolamine, triethanolalkyne, morpholine, tripropylamine, ethanolamine, and tri-isopropanolamine. The listed examples may be used alone, or at least two of the listed examples may be used in combination.

The polyurethane-based resin may be prepared by using an organic solvent that does not react with the polyisocyanate but is water-soluble. Examples of the organic solvent may include: ester-based solvents such as ethyl acetate and ethyl cellosolve acetate; ketone-based solvents such as acetone, methylethylketone, and methylisobutylketone; and ether-based solvents such as dioxane tetrahydrofuran. The listed examples may be used alone, or at least two of the listed examples may be used in combination.

Preferably, the polyurethane-based resin may have a weight-average molecular weight ranging from 10,000 to 1,000,000. If the weight-average molecular weight of the polyurethane-based resin is less than 10,000, the adhesion of the polyurethane-based resin is too low, and if the weight-average molecular weight of the polyurethane resin is greater than 1,000,000, it is difficult to prepare the polyurethane-based resin in water.

If the polyurethane-based resin is dispersible in water, the polyurethane-based resin may have a carboxyl group. If the polyurethane-based resin has a carboxyl group, during a manufacturing process, anions are generated to facilitate dispersion of the polyurethane-based resin in water, and thus the polyurethane-based resin may be brought into good adhesion to the protective film 33. The polyurethane-based resin including a carboxyl group may be obtained through a reaction between polyol, polyisocyanate, and a chain extender having a free carboxyl group. Examples of the chain extender having a carboxyl group may include dihydroxy carboxylic acid and dihydroxy succinic acid. The dihydroxy carboxylic acid may be dialkylol alkanoic acid including dimethylol alkanoic acid. Examples of the dimethylol alkanoic acid may include dimethylol acetic acid, dimethylol butanoic acid, dimethylol propionic acid, dimethylol butyric acid, and dimethylol pentanoic acid. The listed examples may be used alone or in combination.

An acrylic resin that may be used as the low-refractive polymer resin may be prepared by polymerizing acrylic monomers. The acrylic monomers may have a glass transition temperature higher than room temperature. Non-limiting examples of the acrylic monomers may include methyl methacrylate, ethyl methacrylate, isobutyl methacrylate, and a mixture thereof. At least one kind of acrylic monomer having a glass transition temperature lower than room temperature, such as methoxy ethylamino acrylate, butyl acrylate, hexyl acrylate, or ethylhexyl acrylate, may also be used to form the acrylic resin, so as to improve the adhesion and film-formability of the acrylic resin.

If the acrylic resin is soluble or dispersible in water, at least one kind of water-soluble acrylic monomer may be included in the acrylic resin. Examples of the water-soluble acrylic monomer may include hydroxyhexyl acrylate, hydroxyethyl acrylamide, methacrylic acid, and combinations thereof.

A polyester-based resin that may be used as the low-refractive polymer resin may be prepared by polymerizing a polyol and a dicarboxylic acid by an esterification method, or polymerizing a polyol and a dicarboxylic acid diester by a transesterification method.

The dicarboxylic acid or the dicarboxylic acid diester is not limited to a particular kind or a preparation method. For example, a raw material generally used to prepare a polyester resin may be used. For example, one or more of aliphatic dicarboxylic acids, alicyclic dicarboxylic acids, aromatic dicarboxylic acids, and diesters thereof may be used alone or in combination. In addition, a substance such as an acid halide or an acid anhydride capable of forming an ester may also be used. If the polyester-based resin is dispersible in water, isophthalic acid with sulfonate may be used as the dicarboxylic acid.

If necessary, the polyester-based resin may be additionally copolymerized with an acrylic monomer to obtain a polyester acrylic resin including ester units and acrylic units. In the present disclosure, for example, the acrylic monomer may include at least one selected from the group consisting of alkyl(meth)acrylate, alkyl acrylate, epoxy (meth)acrylate, hydroxyalkyl acrylate, alkyl(meth)acrylic acid having a carboxyl group, alkyl acrylic acid, and acrylate having sulfonate.

In the present disclosure, the low-refractive polymer resin may preferably have a refractive index of 1.55 or lower, more preferably 1.53 or lower or 1.50 or lower. If the refractive index of the low-refractive polymer resin is within the above-mentioned range, the effect of preventing reflection may be obtained more effectively.

The fine hollow particles are included in the coating composition for decreasing the refractive index of the primer layer 34 and thus maximizing the effect of anti-reflection. Any fine hollow particles may be used without limitations as long as the fine hollow particles are mixed with the low-refractive polymer resin for reducing the refractive index of the primer layer 34 within the above-mentioned range. Non-limiting examples of the fine hollow particles may include inorganic fine particles such as silica-based fine particles, aluminum oxide-based fine particles, or titanium oxide-based fine particles, and organic fine particles such as acrylic fine particles, silicone-based fine particles, or polystyrene-based fine particles.

The fine hollow particles may be hollow silica particles. If hollow silica particles are mixed with a polymer resin, the refractive index of the primer layer 34 may be markedly decreased. The hollow silica particles may be crystalline or amorphous particles. Particularly, the hollow silica particles may be monodisperse particles. The fine hollow particles may have a spherical shape. However, irregularly shaped particles may be used as the fine hollow particles. In addition, hollow silica particles surface-treated with a silane coupling agent may be used as the fine hollow particles. In this case, dispersion of the fine hollow particles in a solvent may be improved, and the durability of a coating layer may be improved because the fine hollow particles form a network together with a binder during a hardening process. The hollow silica particles may be manufactured by any method. For example, the hollow silica particles may easily be formed by a method well known in the related art.

The fine hollow particles may preferably have a refractive index of 1.40 or less. For example, the fine hollow particles may have a refractive index ranging from about 1.17 to about 1.35 or from about 1.17 to about 1.30. Here, the term refractive index does not refer to the refractive index of the outsides of the fine hollow particles but refers to the refractive index of the whole fine hollow particles. If the refractive index of the fine hollow particles is greater than the above-mentioned range, reflection-preventing characteristics desired in the present disclosure may not be obtained.

In addition, the fine hollow particles may preferably have a degree of porosity ranging from 10% to 60%, more preferably from 20% to 60%, most preferably from 30% to 60%. In this case, superior anti-reflection performances may be obtained.

In addition, the fine hollow particles may preferably have an average particle diameter ranging from 10 nm to 200 nm, more preferably from 30 nm to 80 nm. If the average particle diameter of the fine hollow particles is within the above-mentioned range, visible light may not be scattered by the fine hollow particles, and thus a transparent film may be formed.

Preferably, the content of the fine hollow particles may be 10 parts by weight to 300 parts by weight, more preferably 40 parts by weight to 200 parts by weight, based on 100 parts by weight of the low-refractive polymer resin. If the content of the fine hollow particles is within the above-mentioned range, the refractive index of the primer layer 34 is adjustable, and superior anti-reflection performances may be obtained.

The fine hollow particles may be soluble in water, dispersible in water, soluble in an organic solvent, or dispersible in an organic solvent. In more detail, if the low-refractive polymer resin is soluble or dispersible in water, the fine hollow particles may be dispersible in water, and if the low-refractive polymer resin is soluble or dispersible in an organic solvent, the fine hollow particles may be dispersible in the organic solvent.

2. Upper Polarizing Plate

Next, the upper polarizing plate 10 of the liquid crystal display device of the present disclosure will be described.

In the present disclosure, any polarizing plate generally used in a liquid crystal display device may be used as the upper polarizing plate 10 without limitations. For example, the upper polarizing plate 10 may have a structure of protective film/polarizer, polarizer/protective film, or protective film/polarizer/protective film.

In this case, a polarizer known in the related art, such as a film formed of polyvinyl alcohol containing iodine or a dichroic dye, may be used as the polarizer of the upper polarizing plate 10 without any limitations. In addition, the polarizer may be manufactured by any method.

In addition, the protective film of the upper polarizing plate 10 may be an acrylic film, a polyethylene terephthalate (PET) film, a triacetyl cellulose (TAC) film, a polynorbornene (PNB) film, a cycloollefin polymer (COP) film, a polycarbonate (PC) film, or the like. Particularly, the protective film may be an acrylic film. Detailed features of the acrylic film are the same as described above.

The polarizer and the protective film may be attached to each other as follows: after applying an adhesive to the polarizer or the protective film using a roll coater, a gravure coater, a bar coater, a knife coater, or a capillary coater, the polarizer and the protective film are attached to one another by a heating method using attachment rolls or a room-temperature pressing method using attachment rolls. The adhesive may be any adhesive used in the related art such as a polyvinyl alcohol-based adhesive, a polyurethane-based adhesive, an acrylic adhesive, a cation-based adhesive, or a radical-based UV adhesive.

The upper polarizing plate 10 may include a retardation film to compensate for an optical phase difference generated in the liquid crystal cell 20. In this case, the upper polarizing plate 10 may have a structure of protective film/polarizer/protective film/retardation film. In the present disclosure, the retardation film is not limited to a particular type thereof. For example, any retardation film generally used in the related art may be used according to various liquid crystal modes of the liquid crystal display device.

3. Liquid Crystal Cell

Next, the liquid crystal cell 20 of the liquid crystal display device of the present disclosure will be described.

In the present disclosure, any liquid crystal cell generally used in a liquid crystal display device may be used as the liquid crystal cell 20 without limitations. For example, the liquid crystal cell 20 may have a structure of upper transparent substrate/color filter/protective film/transparent conductive-film electrode/alignment layer/liquid crystals/alignment layer/thin transistors/lower transparent substrate. Liquid crystals operating in various modes may be used in the liquid crystal cell 20. For example, the liquid crystal cell 20 may include liquid crystals operating in a mode such as a double domain twisted Nematic (TN) mode, an axially symmetric aligned microcell (ASM) mode, an optically compensated blend (OCB) mode, a vertical alignment (VA) mode, a multidomain VA mode, a surrounding electrode (SE) mode, a patterned VA (PVA) mode, an in-plane switching (IPS) mode, or a fringe-field switching (FFS) mode.

In the liquid crystal display device of the present disclosure, the liquid crystal cell 20 and the polarizers 10 and 30 may be attached to each other by any method such as a method generally used in the related art.

4. Backlight Unit

Next, the backlight unit 40 of the liquid crystal display device of the present disclosure will be described.

A backlight unit generally used in a liquid crystal display device may be used as the backlight unit 40 without limitations. For example, the backlight unit 40 may include a light source and a plurality of optical films. Various liquid sources may be used in the backlight unit 40. For example, the backlight unit 40 may include a light source such as a cold cathode fluorescent lamp (CCFL), an external electrode fluorescent lamp (EEFL), a light emitting diode (LED), or a flat fluorescent lamp (FFL). Any optical films well known in the related art as backlight unit films, such as a prism sheet, a diffusion film, a light guide plate, a diffusion plate, or a reflection film, may be used as the optical films of the backlight unit 40.

[Mode for Invention]

Hereinafter, embodiments of the present disclosure will be described more specifically through examples.

Manufacturing Example 1—Primer Layer Coating Solutions (1) Primer Layer Coating Solution A 2.53 g of a water-dispersible polyurethane resin (aliphatic polycarbonate diol type CK-PUD-PF by Chokwang Paint Corporation, solid content: 30%, refractive index: 1.50), 3.45 g of water-dispersible hollow silica (by Japan JGC Catalysts and Chemicals, solid content: 8.8%, refractive index: 1.29), and 14.01 g of pure water were mixed to prepare a coating solution A having a total solid content of 5% (30 parts by weight of the water-dispersible hollow silica for every 100 parts by weight of the water-dispersible polyurethane resin).

(2) Primer Layer Coating Solution B 2.33 g of a water-dispersible polyurethane resin (aliphatic polycarbonate diol type CK-PUD-PF by Chokwang Paint Corporation, solid content: 30%, refractive index: 1.50), 3.18 g of water-dispersible hollow silica (by Japan JGC Catalysts and Chemicals, solid content: 8.8%, refractive index: 1.29), and 14.48 g of pure water were mixed to prepare a coating solution B having a total solid content of 5% (40 parts by weight of the water-dispersible hollow silica for every 100 parts by weight of the water-dispersible polyurethane resin).

(3) Primer Layer Coating Solution C 2.33 g of a water-dispersible polyacrylic/ester resin (by Japan Takamatsu, solid content: 30%, refractive index: 1.50), 3.18 g of water-dispersible hollow silica (by Japan JGC Catalysts and Chemicals, solid content: 8.8%, refractive index: 1.29), and 14.48 g of pure water were mixed to prepare a coating solution C having a total solid content of 5% (30 parts by weight of the water-dispersible hollow silica for every 100 parts by weight of the water-dispersible polyacrylic/ester resin).

(4) Primer Layer Coating Solution D 3.33 g of a water-dispersible polyurethane resin (aliphatic polycarbonate diol type CK-PUD-PF by Chokwang Paint Corporation, solid content: 30%, refractive index: 1.50), and 16.67 g of pure water were mixed to prepare a coating solution D having a total solid content of 5%.

(5) Primer Layer Coating Solution E 3.03 g of a water-dispersible silicone-modified polyurethane resin (SILICOPUR-808 by Tego, solid content: 33%, refractive index: 1.47), and 16.97 g of pure water were mixed to prepare a coating solution E having a total solid content of 5%.

(6) Primer Layer Coating Solution F 3.33 g of a water-dispersible polyurethane resin (aliphatic polycarbonate diol type CK-PUD-PF by Chokwang Paint Corporation, solid content: 30%, refractive index: 1.50), water-dispersible silica (by Ranco, solid content: 20%), and 15.67 g of pure water were mixed to prepare a coating solution F having a total solid content of 5%.

Manufacturing Example 2—Adhesive Composition

An adhesive composition was prepared by mixing 20 g of 3,4-epoxycyclohexylmethyl-3,4-epoxycyclcohexanecarboxylate (Celloxide 2021P by Dice), 20 g of 1,4-cyclohexanedimethanol diglycidyl ether, 45 g of 3-ethyl-3-[(3-ethyloxetane-3-yl)methoxymethyl]oxetane (oxt-221 by Toagosei), and 5 g of triacrylsulfonium hexafluorophosphate (UVI-6992 by Dow Chemical).

Example 1

A non-stretched acrylic film having a width of 800 mm was formed of a poly(cyclohexyl maleimide-co-methylmethacrylate) resin (PMMA830HR by LGMMA Corporation) under process conditions of 250° C. and 250 rpm by using a T-die film forming machine. Then, the acrylic film was stretched at 135° C. in an MD direction by a factor of 1.8. The acrylic film stretched in the MD direction was corona-treated at 50 W/m$^2$/min. Then, the acrylic film was coated with the primer coating solution A by using Mayer bar #3 and was dried by blowing 90° C. air for 3 minutes. Thereafter, the acrylic film was stretched at 135° C. in a TD direction by a factor of 2.4 so as to form an acrylic protective film (having a thickness of 50 µm) including a primer layer on one side thereof.

The adhesive composition prepared in the above was applied to the other side of the acrylic protective film opposite the side on which the primer layer was formed, and a polarizer (PVA device) was disposed on the other side of the acrylic protective film. Then, the adhesive composition prepared in the above was applied to an opposite side of the polarizer, and a VA retardation film (K10 by Konica) was disposed on the opposite side of the polarizer. Thereafter, the acrylic protective film, the polarizer, and the VA retardation film were passed through a laminator (at a rate of 5 m/min) under the condition that final adhesive layers have a thickness of 1 µm to 2 µm. Thereafter, ultraviolet rays were emitted thereto by using a UV radiation device (metal halide lamp) at an intensity of 1000 mJ/cm$^2$. In this way, a polarizing plate was manufactured.

Example 2

A polarizing plate was manufactured in the same manner as in Example 1 except for the primer layer coating solution B was used instead of the primer layer coating solution A.

Example 3

A polarizing plate was manufactured in the same manner as in Example 1 except for the primer layer coating solution C was used instead of the primer layer coating solution A.

Comparative Example 1

A polarizing plate was manufactured in the same manner as in Example 1 except for the primer layer coating solution D was used instead of the primer layer coating solution A.

Comparative Example 2

A polarizing plate was manufactured in the same manner as in Example 1 except for the primer layer coating solution E was used instead of the primer layer coating solution A.

Comparative Example 3

A polarizing plate was manufactured in the same manner as in Example 1 except for the primer layer coating solution F was used instead of the primer layer coating solution A.

Experimental Example 1

The refractive index, reflectivity, transmittance, haze, static friction coefficient, and dynamic friction coefficient of each of the polarizing plates manufactured in the examples and comparative examples were measured as shown in Table 1 below. The measurement was carried out by a method described below.

1. Refractive index: a coating solution was applied to a glass substrate by using Mayer bar #20 and was dried at 140° C. for 1 minute, and refractive index values were measured three times with a prism coupler (SPA-3DR by Sarion Technology Inc.). Then, the average of the refractive index values was calculated.

2. Reflectivity: a back sheet (black PET film) was attached to a side of a protective film opposite to a side thereof on which a primer layer was formed, and reflectivity values were measured three times by using a spectrum colorimeter (CM-2600d by Konica Minolta). Then, the average of the reflectivity values was calculated.

3. Transmittance: the transmittance of a protective film including a primer layer was measured three times with a haze meter (HM-150), and the average of the measured transmittance values was calculated. At that time, a light source D65 was used, and transmittance standard stated in JTS K 7361 was followed.

4. Transmittance of polarizing plate: transmittance values were measured three times with V-7100 by JASCO, and the average of the measured transmittance values was calculated.

5. Haze: the haze of a protective film including a primer layer was measured three times with a haze meter (HM-150), and the average of the measured haze values was calculated. At that time, a light source D65 was used, and transmittance standard stated in JTS K 7361 was followed.

6. Static friction coefficient: a protective film (10×20 cm) coated with a primer layer was fixed to a friction coefficient measuring instrument (FP-2260), and a 20 g sled to which a non-coated protective film (6×6 cm) was placed thereon. Thereafter, the sled was pulled at a speed of 15.0 cm/min by a length of 8 cm, and the maximum friction coefficient within the initial 1-cm range of the total 8-cm range was measured three times. Then, the average of the measured maximum friction coefficient values was calculated as a static friction coefficient.

7. Dynamic friction coefficient: in the 8-cm range of the static friction coefficient measurement, friction coefficient values were measured three times within the rest range after the initial 1-cm range, and the average of the measured friction coefficient values was calculated as a dynamic friction coefficient.

TABLE 1

| No. | Refractive index | Reflectivity (%) | Transmittance (%) | Polarizing plate transmittance (%) | Haze (%) | Static friction coefficient | Dynamic friction coefficient |
|---|---|---|---|---|---|---|---|
| Example 1 | 1.47 | 2.62 | 93.6 | 43.64 | 0.3 | 0.53 | 0.48 |
| Example 2 | 1.45 | 2.33 | 93.9 | 43.92 | 0.4 | 0.54 | 0.47 |
| Example 3 | 1.47 | 2.36 | 93.6 | 43.66 | 0.3 | 0.55 | 0.46 |
| Comparative Example 1 | 1.50 | 4.10 | 92.3 | 43.17 | 0.2 | 1.10 | 0.85 |
| Comparative Example 2 | 1.48 | 3.23 | 92.8 | 43.44 | 0.5 | 1.22 | 0.90 |
| Comparative Example 3 | 1.49 | 3.85 | 92.4 | 43.22 | 0.3 | 0.52 | 0.46 |

As shown in Table 1, the primer layers of the high brightness polarizing plates of the examples of the present disclosure have a refractive index of 1.48 or less, reflectivity of 3.5% or less, transmittance of 93% or greater, and static and dynamic friction coefficients equal to or less than 0.8. That is, the primer layers of the high brightness polarizing plates of the present disclosure have superior reflection-preventing and anti-blocking characteristics.

However, since the primer layer of Comparative Example 1 only includes a binder resin, all the properties of the primer layer such as a refractive index, reflectivity, transmittance, and friction coefficients are not satisfactory. In addition, since the primer layer of Comparative Example 2 includes a binder resin having a relatively low refractive index, the refractive index, reflectivity, and transmittance of the primer layer are somewhat low. However, the primer layer has poor anti-blocking characteristics. In addition, the primer layer of Comparative Example 3 has superior anti-blocking characteristics because the primer layer includes silica. However, the primer layer has poor anti-reflection ability.

Experimental Example 2

The polarizing plates of the examples of the present disclosure were used as lower polarizing plates for evaluating the effect of brightness improvement. For this, the increased amounts of brightness were measured relative to the case in which polarizing plates not including primer layers were used as lower polarizing plates, and measured results are shown in Table 2. In detail, the polarizing plates manufactured in the examples and the comparative examples were attached to liquid crystal cells (by CMI, 31.5 inch) located above backlight units (BLU) in such a manner that the primer layers of the polarizing plates were adjacent to the backlight units. Thereafter, white brightness values were measured under darkroom conditions by using a brightness measuring camera (SRUL 1R by Topcon), and the measured white brightness values were compared with brightness values measured in standard conditions in which no primer layer was used (white brightness: 430) so as to evaluate how much the brightness values were increased.

TABLE 2

| No. | Brightness increase (%) |
|---|---|
| Example 1 | 1.52 |
| Example 2 | 1.78 |
| Example 3 | 1.54 |

As shown in Table 2, when the polarizing plates of the examples of the present disclosure were used as lower polarizing plates, although additional brightness improving films were not used, brightness was simply improved by 1.5% or greater relative to the case of using normal polarizing plates of the related art in which primer layers are not formed on backlight unit side protective films.

While exemplary embodiments have been shown and described above, it will be apparent to those skilled in the art that modifications and variations could be made without departing from the scope of the present disclosure as defined by the appended claims.

EXPLANATION OF REFERENCE NUMERAL

10: upper polarizing plate
20: liquid crystal cell
30: high brightness polarizing plate
31: liquid crystal cell side protective film
32: polarizer
33: backlight unit side protective film
34: primer layer
40: backlight unit
41: light emitted from backlight unit

The invention claimed is:

1. A liquid crystal display device comprising:
   a liquid crystal cell;
   an upper polarizing plate disposed above the liquid crystal cell;
   a lower polarizing plate disposed below the liquid crystal cell; and
   a backlight unit disposed below the lower polarizing plate,
   wherein the lower polarizing plate comprises:
      a polarizer; and
      a protective film disposed on a side of the polarizer,
         wherein the protective film faces a backlight unit, and
         a primer layer comprising a low-refractive polymer resin and fine hollow particles is formed directly on a side of the protective film opposite to a side thereof facing the polarizer,
      wherein the primer layer is adjacent to the backlight unit, and is closer to the backlight unit than the protective film,
      wherein the low-refractive polymer resin is water-dispersible, and comprises a polyurethane-based resin, a polyester-based resin, or a combination thereof, and
      wherein the fine hollow particles are water-dispersible, and have an average particle size of 10 nm to 200 nm.

2. The liquid crystal display device of claim 1, wherein the primer layer has a refractive index of 1.48 or lower.

3. The liquid crystal display device of claim 1, wherein the primer layer has a static friction coefficient of 0.8 or lower.

4. The liquid crystal display device of claim 1, wherein the primer layer has a dynamic friction coefficient of 0.8 or lower.

5. The liquid crystal display device of claim 1, wherein the fine hollow particles are hollow silica particles.

6. The liquid crystal display device of claim 1, wherein the fine hollow particles have a refractive index of 1.17 to 1.40.

7. The liquid crystal display device of claim 1, wherein the fine hollow particles are included in an amount of 10 parts by weight to 300 parts by weight based on 100 parts by weight of the low-refractive polymer resin.

8. The liquid crystal display device of claim 1, wherein the low-refractive polymer resin has a refractive index of 1.55 or lower.

9. The liquid crystal display device of claim 1, wherein the primer layer has a thickness of 10 nm to 500 nm.

10. The liquid crystal display device of claim 1, wherein the protective film has a reflectivity of 3.5% or lower.

11. The liquid crystal display device of claim 1, wherein the protective film has a transmittance of 93% or higher.

* * * * *